United States Patent
Lee et al.

(10) Patent No.: US 10,673,283 B2
(45) Date of Patent: Jun. 2, 2020

(54) WIRELESS POWER TRANSMISSION SYSTEM USING META-STRUCTURE TRANSMISSION LINE CAPABLE OF PERFORMING BEAM STEERING

(71) Applicant: UNIVERSITY-INDUSTRY COOPERATION GROUP OF KYUNG HEE UNIVERSITY, Yongin-si, Gyeonggi-do (KR)

(72) Inventors: Bom Son Lee, Yongin-si (KR); Gun Young Kim, Andong-si (KR); Jun Ho Lee, Yeosu-si (KR); Se Jin Kim, Seoul (KR); Se Hun Na, Gwangju (KR); Sung Youn Hwang, Suwon-si (KR)

(73) Assignee: UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 190 days.

(21) Appl. No.: 16/073,134

(22) PCT Filed: Dec. 26, 2017

(86) PCT No.: PCT/KR2017/015462
§ 371 (c)(1),
(2) Date: Jul. 26, 2018

(87) PCT Pub. No.: WO2018/124687
PCT Pub. Date: Jul. 5, 2018

(65) Prior Publication Data
US 2019/0044389 A1 Feb. 7, 2019

(30) Foreign Application Priority Data

Dec. 26, 2016 (KR) .................. 10-2016-0178931
Dec. 21, 2017 (KR) .................. 10-2017-0176999

(51) Int. Cl.
*H02J 50/23* (2016.01)
*H04B 5/00* (2006.01)
(Continued)

(52) U.S. Cl.
CPC ............... *H02J 50/23* (2016.02); *H01Q 3/24* (2013.01); *H01Q 3/2605* (2013.01); *H01Q 3/44* (2013.01);
(Continued)

(58) Field of Classification Search
CPC . H02J 50/23; H02J 50/12; H02J 50/20; H04B 5/0037
See application file for complete search history.

(56) References Cited

FOREIGN PATENT DOCUMENTS

| KR | 10-2012-0009929 A | 2/2012 |
| KR | 10-2014-0005739 A | 1/2014 |

(Continued)

OTHER PUBLICATIONS

International Search Report for PCT/KR2017/015462 dated Mar. 30, 2018 [PCT/ISA/210].
(Continued)

*Primary Examiner* — Robert L Deberadinis
(74) *Attorney, Agent, or Firm* — Sughrue Mion, PLLC

(57) ABSTRACT

Disclosed is a wireless power transmission system using a meta-structure transmission line capable of performing beam steering. The wireless power transmission device using a meta-structure transmission line capable of performing beam steering includes a beam steerer including a meta-structure transmission line constituted of a plurality of single cells; a controller configured to control an operation mode and beam scanning of the beam steerer; and a power supply configured to supply power to the beam steerer under control of the controller.

10 Claims, 18 Drawing Sheets

(51) Int. Cl.
  *H01Q 3/26* (2006.01)
  *H01Q 3/24* (2006.01)
  *H02J 50/12* (2016.01)
  *H02J 50/20* (2016.01)
  *H01Q 3/44* (2006.01)
  *H01Q 15/00* (2006.01)

(52) U.S. Cl.
  CPC .............. *H02J 50/12* (2016.02); *H02J 50/20* (2016.02); *H04B 5/0037* (2013.01); *H01Q 15/0086* (2013.01)

(56) References Cited

FOREIGN PATENT DOCUMENTS

| KR | 10-2014-0065630 A | 5/2014 |
| KR | 10-2016-0086252 A | 7/2016 |
| WO | 2014/162508 A1 | 10/2014 |

OTHER PUBLICATIONS

Communication dated Oct. 24, 2019, issued by the Korean Patent Office in counterpart Korean Patent Application No. 10-2017-0176999.

WIRELESS POWER TRANSMISSION SYSTEM USING META-STRUCTURE TRANSMISSION LINE CAPABLE OF PERFORMING BEAM STEERING

CROSS-REFERENCE TO RELATED APPLICATIONS

This application claims priority to Korean Patent Application No. 10-2016-0178931, filed on Dec. 26, 2016, and Korean Patent Application No. 10-2017-0176999, filed on Dec. 21, 2017, based on the priority of the above patent, in the Korean Intellectual Property Office, the disclosures of each of which are incorporated herein by reference.

TECHNICAL FIELD

The present invention relates to wireless power transmission, and more particularly to a wireless power transmission system using a meta-structure transmission line capable of performing beam steering.

BACKGROUND ART

Wireless power transmission systems include a wireless power transmission device for wirelessly transmitting electrical energy and a wireless power reception device for receiving electrical energy from the wireless power transmission device.

By using a wireless power transmission system, a battery of a mobile phone can be charged, for example, merely by placing the mobile phone on a charging pad without connecting the mobile phone to a separate charging connector.

A method of wirelessly transmitting electrical energy can be classified into a magnetic induction method, a magnetic resonance method, and an electromagnetic wave method according to the principle of transferring electrical energy.

A magnetic induction method is a method of transmitting electrical energy using a phenomenon wherein electricity is induced between a transmitter coil and a receiver coil.

A magnetic resonance method is a method of generating a magnetic field oscillating at a resonance frequency in a transmitter coil and intensively transmitting energy to a receiver coil designed to operate at the same resonance frequency.

An electromagnetic wave or microwave method is a method wherein an electromagnetic wave generated in a transmitter is received by a receiver using several rectennas and the received electromagnetic wave is converted into electrical energy.

Meanwhile, wireless power transmission can be classified into flexibly coupled wireless power transfer technology (hereinafter referred to as "flexibly coupled technology") and tightly coupled wireless power transfer technology (hereinafter referred to as "tightly coupled technology") according to the magnetic resonant coupling form or strength of a transmitter coil and a receiver coil.

Here, in the case of the "flexibly coupled technology," magnetic resonant coupling may be formed between one transmitter resonator and a plurality of receiver resonators, whereby multiple concurrent charging may be possible.

Here, the "tightly coupled technology" merely enables power transmission between one transmitter coil and one receiver coil (one-to-one power transmission).

Wireless power transmission systems can be applied to complex wireless channel environments such as homes, offices, airports, and trains.

In addition, wireless power transmission systems can be applied to an environment in which a wireless device/IoT device/wearable device is charged by synthesizing a three-dimensional beam pattern of an array antenna based on beacon positioning technology, etc. in a three-dimensional space.

DISCLOSURE

Technical Problem

Therefore, the present invention has been made in view of the above problems, and it is one object of the present invention to provide a wireless power transmission system applicable to complex wireless channel environments such as homes, offices, airports, and trains.

It is another object of the present invention to provide a wireless power transmission system, which may be easily manufactured, has low manufacturing cost, and is simple, by a meta-structure transmission line capable of performing beam steering.

Technical Solution

In accordance with an aspect of the present invention, the above and other objects can be accomplished by the provision of a wireless power transmission device using a meta-structure transmission line capable of performing beam steering, the wireless power transmission device including a beam steerer including a meta-structure transmission line constituted of a plurality of single cells; a controller configured to control an operation mode and beam scanning of the beam steerer; and a power supply configured to supply power to the beam steerer under control of the controller.

Here, each of the single cells includes a right-handed transmission line, a shunt transmission line with a $\lambda/4$ length connected in parallel to the right-handed transmission line, and a shunt tunable capacitor connected to the shunt transmission line.

The beam steerer may operate in a power receiver navigation mode under operation mode control of the controller, or in a power transmission mode of transmitting power to the receiver by performing beam steering in a direction of the receiver.

The beam steerer may sequentially change a capacitance value ($C_0$) of a serial tunable capacitor of the right-handed transmission line in the receiver navigation mode and a capacitance value ($C_1$) of the shunt tunable capacitor, and the controller may estimate a position of the receiver based on $C_0$ and $C_1$ when a reception signal having a preset value or more is detected in the receiver navigation mode.

The beam steerer may determine a beam direction of the beam steerer using $C_0$ and $C_1$ when a reception signal having a preset value or more is detected in the receiver navigation mode, and the controller may control the power supply such that power having a preset value or more is supplied to the beam steerer.

The right-handed transmission line and the shunt transmission line with a $\lambda/4$ length may have the same reflectance.

The beam steerer may include a first beam steerer configured to perform beam scanning on a floor or ceiling of a wireless charging area; a second beam steerer configured to perform beam scanning on a left or right wall of the wireless charging area; and a third beam steerer configured to perform beam scanning on an opposite side of the second beam steerer, wherein the controller controls a beam scanning progress direction and beam steering change time of each of the first, second, and third beam steerers.

In accordance with another aspect of the present invention, there is provided a method of operating a meta-structure transmission line capable of performing beam steering, the method including a step of supplying power having a preset value or less for navigation mode operation to a meta-structure transmission line constituted of a plurality of single cells; and a step of performing the receptor navigation mode by sequentially controlling output phases of the meta-structure transmission line.

Advantageous Effects

In accordance with the present invention, selective wireless power transmission in a three-dimensional space in visible and non-visible distance environments may be efficiently provided.

In accordance with the present invention, by using a meta-structure transmission line capable of performing beam steering, a wireless power transmission system may be simply constituted and a wireless power transmission device having low manufacturing cost may be provided.

MODES OF THE INVENTION

Embodiments of the present invention are described with reference to the accompanying drawings and the description thereof, but are not limited thereto.

The terminology used in the present invention serves the purpose of describing particular embodiments only and is not intended to limit the invention. As used in the invention and the appended claims, the singular forms "a", "an" and "the" are intended to include the plural forms as well, unless context clearly indicates otherwise. It will be further understood that the terms "includes" and/or "including," when used in this specification, specify the presence of stated features, steps, operations, elements, and/or components, but do not preclude the presence or addition of one or more other features, steps, operations, elements, components, and/or groups thereof.

It should not be understood that arbitrary aspects or designs disclosed in "embodiments", "examples", "aspects", etc. used in the specification are more satisfactory or advantageous than other aspects or designs.

In addition, the expression "or" means "inclusive or" rather than "exclusive or". That is, unless otherwise mentioned or clearly inferred from context, the expression "x uses a or b" means any one of natural inclusive permutations.

Further, as used in the description of the invention and the appended claims, the singular forms "a", "an" and "the" are intended to include the plural forms as well, unless context clearly indicates otherwise.

In addition, terms such as "first" and "second" are used in the specification and the claims merely to describe a variety of constituent elements, but the constituent elements are not limited by the terms. The terms are used only for the purpose of distinguishing one constituent element from another constituent element.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

Meanwhile, in the following description of the present invention, a detailed description of known functions and configurations incorporated herein will be omitted when it may make the subject matter of the present invention unclear. The terms used in the specification are defined in consideration of functions used in the present invention, and can be changed according to the intent or conventionally used methods of clients, operators, and users. Accordingly, definitions of the terms should be understood on the basis of the entire description of the present specification.

Figure 1:
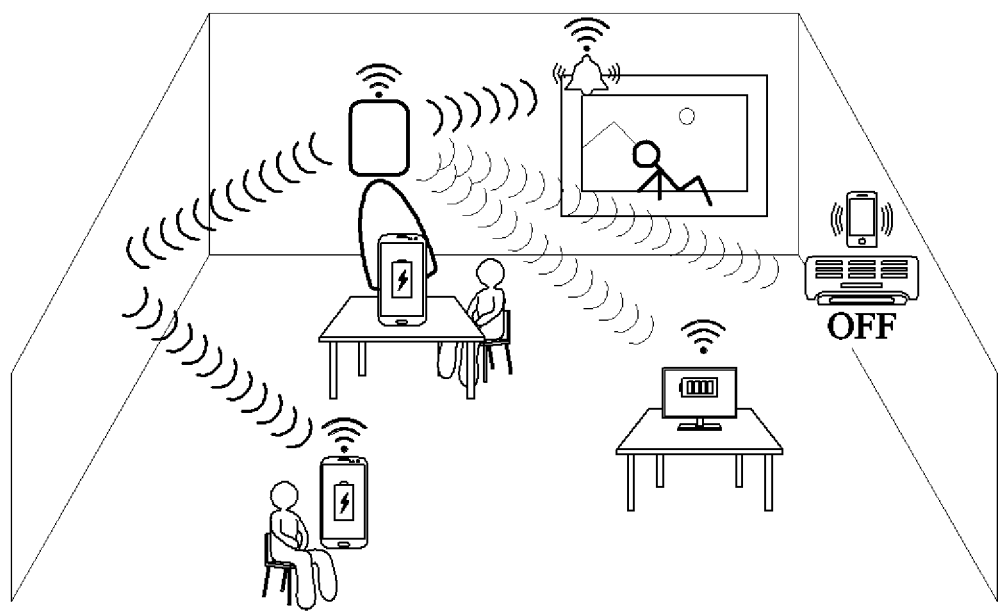
FIG. 1 is an exemplary diagram illustrating an environment where a wireless power transmission system is applied.

FIG. 1 is an exemplary diagram illustrating an environment where a wireless power transmission system is applied.

As illustrated in FIG. 1, a wireless power transmission environment may be a three-dimensional space such as a living room or a room in a home, an office, an airport, or a train.

Power transmission in a three-dimensional space may be performed by near-field wireless power transmission adopting a magnetic induction method or a magnetic resonance method. In addition, an electromagnetic wave method capable of covering near and far distances depending upon the location and type of a power reception device may be used.

Meanwhile, a power reception device may be a communication device. The power reception device may be provided with an RF harvesting device capable of collecting energy from electromagnetic waves in a three-dimensional space.

Figure 2:
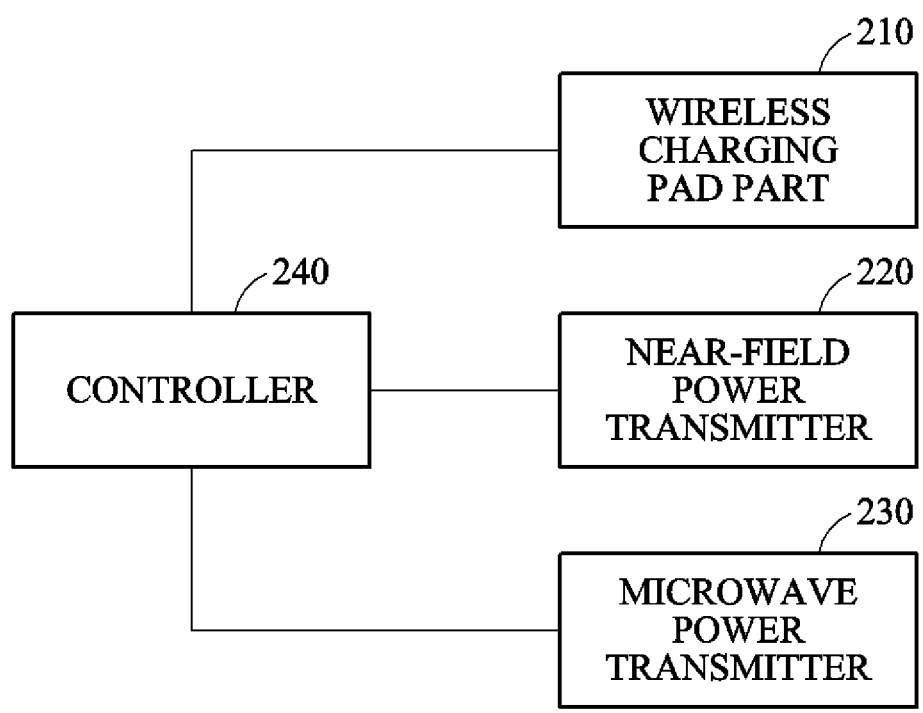
FIG. 2 is a view illustrating a wireless power transmission device capable of transmitting power in various manners in an environment as illustrated in FIG. 1.

FIG. 2 is a view illustrating a wireless power transmission device capable of transmitting power in various manners in an environment as illustrated in FIG. 1.

Referring to FIG. 2, the wireless power transmission device may include at least one of a wireless charging pad part 210, a near-field power transmitter 220, and a microwave power transmitter 230.

In other words, although all of the wireless charging pad part 210, the near-field power transmitter 220, and the microwave power transmitter 230 are illustrated in FIG. 2, a power transmission device using one power transmission manner may be merely provided depending upon a three-dimensional space environment.

Accordingly, in the following description, the wireless power transmission device or the power transmission device should be understood as including at least one of the wireless charging pad part 210, the near-field power transmitter 220, and the microwave power transmitter 230.

A controller 240 may control operation of at least one of the wireless charging pad part 210, the near-field power transmitter 220, and the microwave power transmitter 230.

The controller 240 may monitor a three-dimensional space environment and, based on the monitoring result, may control operation of at least one of the wireless charging pad part 210, the near-field power transmitter 220, and the microwave power transmitter 230.

For example, when long-distance transmission is unnecessary, the controller 240 may control the wireless charging pad part 210 and the near-field power transmitter 220 to operate and the microwave power transmitter 230 not to operate.

The wireless charging pad part 210 may transmit power by a magnetic induction method or a magnetic resonance method.

The near-field power transmitter 220 may transmit power to a three-dimensional space by a magnetic resonance method.

The microwave power transmitter 230 may transmit power to a three-dimensional space by a microwave power transmission method.

Meanwhile, "far field" may be defined as a case wherein a distance between a transmitting end and a receiving end is "2×(antenna length)²/wavelength" or more.

Figure 3:
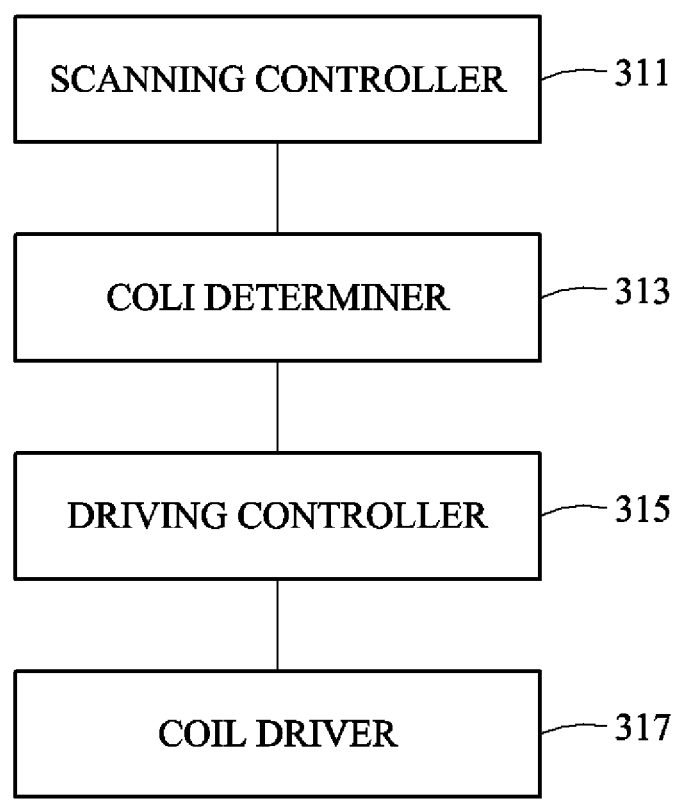
FIG. 3 is a view illustrating another configuration example of the wireless charging pad part of FIG. 2.

FIG. 3 is a view illustrating another configuration example of the wireless charging pad part of FIG. 2.

Figure 4:
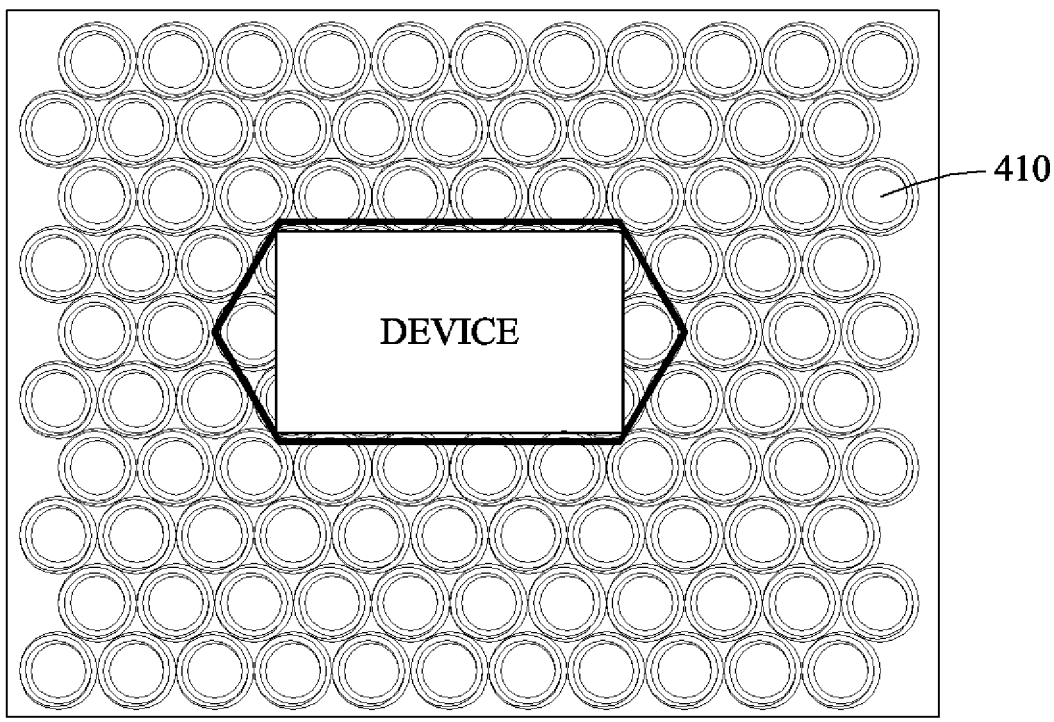
FIG. 4 is a view illustrating another configuration example of a wireless charging pad of a wireless charging pad part according to an embodiment of the present invention.

The device illustrated in FIG. 3 may include a wireless charging pad (not shown) and a device for driving the wireless charging pad. Here, the wireless charging pad may be configured as illustrated in FIG. 4.

The wireless charging pad-driving device may include a driving controller 315 and a coil driver 317. The wireless charging pad-driving device may further include a coil determiner 313 and a scanning controller 311.

The wireless charging pad-driving device according to an embodiment of the present invention may include the driving controller 315 configured to each independently control driving of a plurality of small power transmission coils constituting the wireless charging pad; and a plurality of driving modules configured to respectively drive the small power transmission coils according to a first or second control signal input by the driving controller 315.

The scanning controller 311 scans the wireless charging pad so as to detect a device to be charged on the wireless charging pad constituted of the small power transmission coils.

The scanning controller 311 detects, using at least one of an impedance change and a pressure change in each of the small power transmission coils, whether a device to be charged is placed on the small power transmission coils.

The coil determiner 313 verifies power transmission coils to be driven located under the device to be charged of the small power transmission coils, and verifies power transmission coils surrounding the power transmission coils to be driven among the small power transmission coils.

The driving controller 315 may generate a first control signal to apply a first driving voltage having a first phase to the power transmission coils to be driven, and may generate a second control signal to apply a second driving voltage having a phase different from the first phase to the surrounding power transmission coils.

Here, the power transmission coils to be driven may be small power transmission coils matching a device to be charged. The expression "matching a device to be charged" may refer to a state wherein small power transmission coils are placed under or near a device to be charged to transmit power to the device to be charged.

Figure 6:
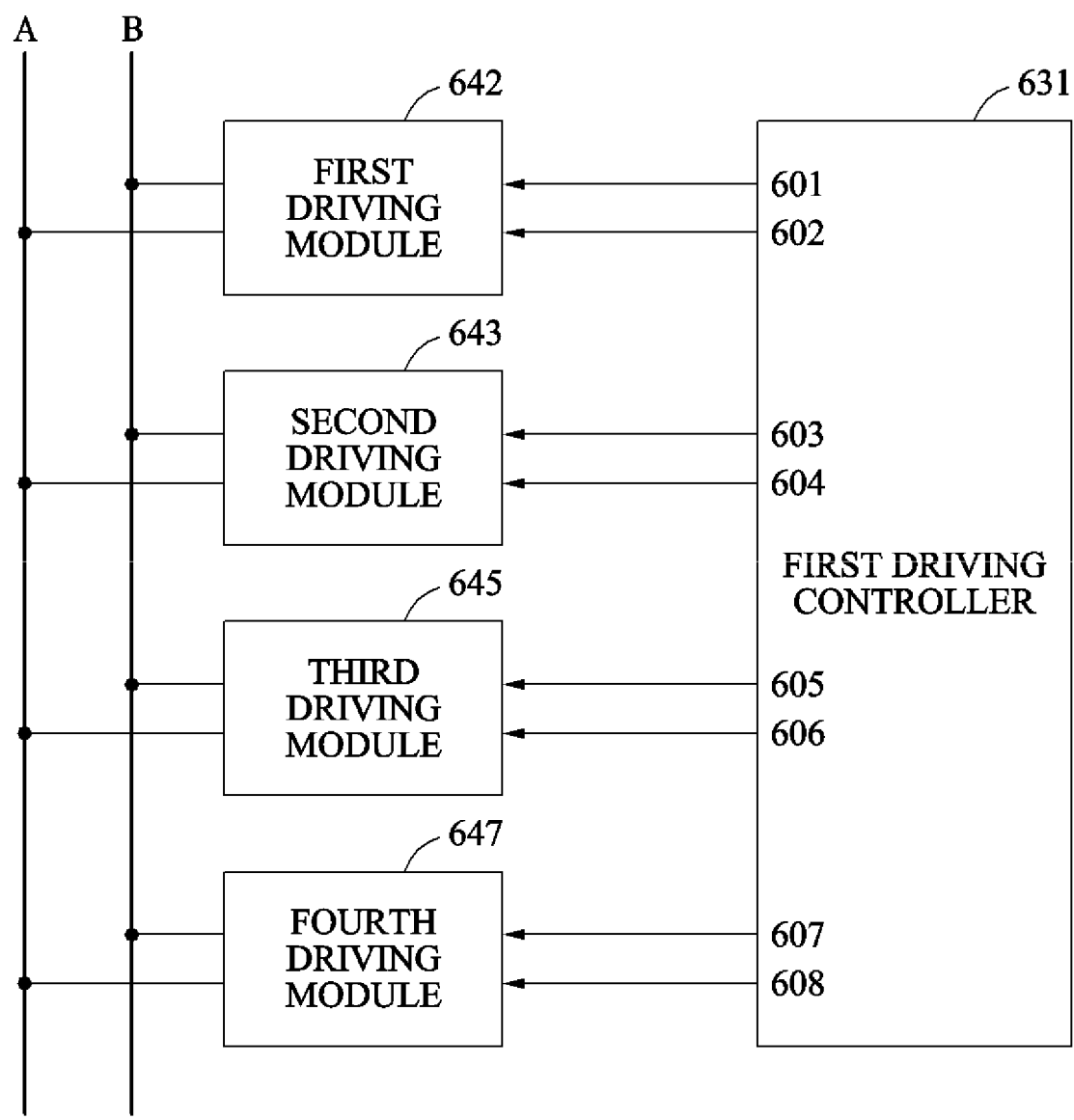
FIG. 6 is a view illustrating another configuration example of the driving controller and coil driver illustrated in FIG. 3.
Figure 7:
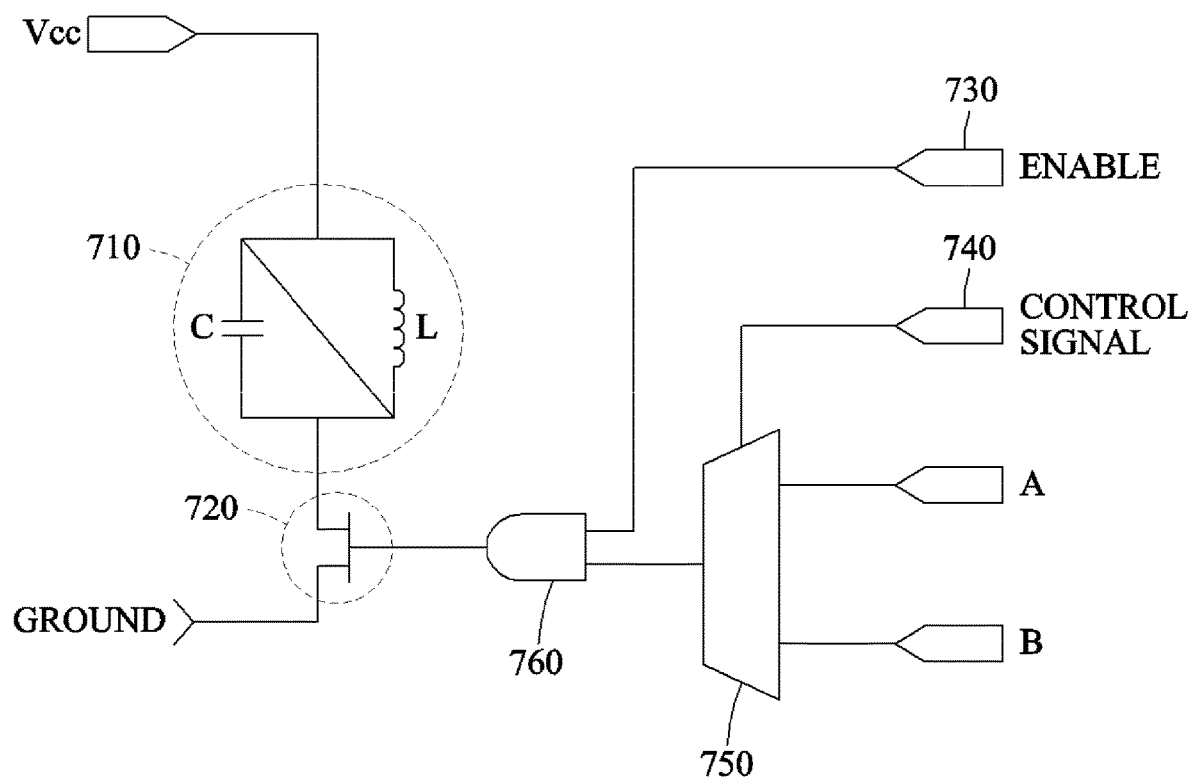
FIG. 7 is a view illustrating another configuration example of a coil driver and a connection between small power transmission coils and the coil driver, according to an embodiment of the present invention.

Here, the first control signal may be a "Select" signal controlling the coil driver 317 to select an "A" signal from among the "A" signal and a "B" signal, which has a phase opposite to the "A" signal, illustrated in FIGS. 6 and 7.

In addition, the second control signal may be a "Select" signal controlling the coil driver 317 to select a "B" signal from among the "A" signal and the "B" signal, which has a phase opposite to the "A" signal, illustrated in FIGS. 6 and 7.

The coil driver 317 applies the first and second driving signals to the wireless charging pad.

FIG. 4 is a view illustrating another configuration example of a wireless charging pad of a wireless charging pad part according to an embodiment of the present invention.

Referring to FIG. 4, small power transmission coils 410 may be disposed in a tessellated structure, without overlapping each other, on the wireless charging pad.

In addition, FIG. 4 illustrates "DEVICE," as an example of a device to be charged, placed on the wireless charging pad.

Here, it is possible to control to only operate small power transmission coils inside a hexagonal bold line inside which "DEVICE" is located, among a total of small power transmission coils.

Figure 5:
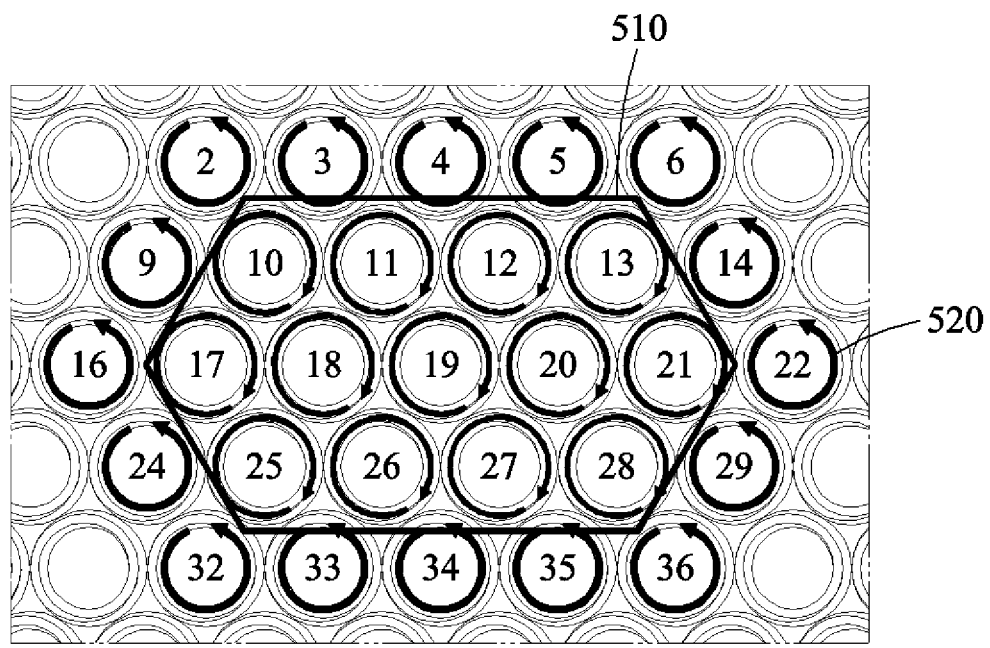
FIG. 5 is a view illustrating an operation example of the wireless charging pad illustrated in FIG. 4, on which a device to be charged is placed.

FIG. 5 is a view illustrating an operation example of the wireless charging pad illustrated in FIG. 4, on which a device to be charged is placed.

Referring to FIGS. 3 and 5, the scanning controller 311 may detect whether a device to be charged is placed on corresponding small power transmission coils, using at least one of an impedance change and a pressure change in each of the small power transmission coils.

For example, upon scanning using an impedance change, a device to be charged may be determined to be placed on corresponding coils when an impedance change in the coils is outside of a preset range.

In addition, when the small power transmission coils are respectively provided with pressure sensors, the pressure sensors may detect whether a device to be charged is placed on the pressure sensors, through pressure change.

The scanning controller 311 may detect whether a device to be charged is placed on coils 10, 11, 12, 13, 17, 18, 19, 20, 21, 25, 26, 27, and 28 by scanning the wireless charging pad.

When coils under a position at which a device to be charged is placed are detected as coils 10, 11, 12, 13, 17, 18, 19, 20, 21, 25, 26, 27, and 28, as a result of scanning by the scanning controller 311, the coil determiner 520 may verify that each of the coils 10, 11, 12, 13, 17, 18, 19, 20, 21, 25, 26, 27, and 28 is a power transmission coil to be driven.

In addition, the coil determiner 313 may verify coils 2, 3, 4, 5, 6, 9, 14, 16, 22, 24, 29, 32, 33, 34, 35, and 36, among the small power transmission coils, as coils surrounding the power transmission coils to be driven 10, 11, 12, 13, 17, 18, 19, 20, 21, 25, 26, 27, and 28.

In the embodiment illustrated in FIG. 5, clockwise arrows indicate a first phase, and counterclockwise arrows indicate a second phase.

The coil driver 317 may output the first driving signal to corresponding small power transmission coils upon receiving input of a first control signal, and may output the second driving signal to corresponding small power transmission coils upon receiving input of a second control signal.

For example, the coil driver 317 may output the first driving signal to each of power transmission coils to be driven 10, 11, 12, 13, 17, 18, 19, 20, 21, 25, 26, 27, and 28, and may output the second driving signal to each of surrounding power transmission coils 2, 3, 4, 5, 6, 9, 14, 16, 22, 24, 29, 32, 33, 34, 35, and 36.

By operating coils under a position, at which a device to be charged is located, in this manner, power is transmitted to the device to be charged. In addition, by operating coils near the coils, which are under a position at which the device to be charged is located, to have an opposite phase, magnetic force lines toward the device to be charged may increase, but magnetic force lines spreading to the outside may be reduced.

Accordingly, even when power transmitted to the device to be charged is increased, power transmission efficiency may be maintained and influence of magnetic field lines on the outside may be reduced.

FIG. 6 is a view illustrating another configuration example of the driving controller and coil driver illustrated in FIG. 3.

FIG. 6 illustrates an embodiment wherein one driving controller (a first driving controller, 631) controls four driving modules 642, 643, 645, and 647.

Although not illustrated in FIG. 6, a plurality of driving controllers, such as second and third driving controllers, other than the first driving controller 631 may be provided.

Here, the first driving controller 631 may be a shift register having eight output signal terminals 601 to 608.

Accordingly, when first driving controllers 631, as shift registers, are connected in a cascade form, circuits for individually driving small power transmission coils may be linearly extended.

The driving modules 642, 643, 645, and 647 may be respectively connected to the small power transmission coils.

For example, the first driving module 642 may be connected to a first small power transmission coil, the second driving module 643 may be connected to a second small power transmission coil, the third driving module 645 may be connected to a third small power transmission coil, and the fourth driving module 647 may be connected to a fourth small power transmission coil.

Accordingly, when the wireless charging pad is provided with 36 small power transmission coils, the wireless charging pad may include 36 driving modules and 9 driving controllers.

Accordingly, a driving device for the wireless charging pad according to an embodiment of the present invention may include a first driving controller configured to each independently control driving of small power transmission coils constituting a first wireless charging module; and a second driving controller configured to each independently control driving of a plurality of small power transmission coils constituting a second wireless charging module.

Here, an end of the second driving controller may be connected to the first driving controller, and another end of the second driving controller may be connected to a third driving controller, thereby supporting expansion of the wireless charge modules.

Referring to FIG. 9 again, the coil driver includes the driving modules 642, 643, 645, and 647 respectively connected to the small power transmission coils.

In addition, the coil driver may include two bus lines that respectively apply a first switching signal A having the first phase and a second switching signal B having the second phase to the driving modules 642, 643, 645, and 647.

The first driving controller 631 applies an enable signal and a first or second control signal, which control a corresponding driving module to operate, to each of the driving modules.

The first driving controller 631 may apply an enable signal to driving modules respectively connected to the power transmission coils to be driven and the surrounding power transmission coils, and may apply the first or second control signal to the driving modules to which the enable signal is applied.

For example, when the first driving module 642 is a driving module connected to a power transmission coil to be driven, the enable signal may be output to a terminal 601, and the first control signal may be output to a terminal 602.

For example, when the fourth driving module 647 is a driving module connected to a surrounding power transmission coil, the enable signal may be output to a terminal 607, and the second control signal may be output to a terminal 608.

FIG. 7 is a view illustrating another configuration example of a coil driver and a connection between small power transmission coils and the coil driver, according to an embodiment of the present invention.

Referring to FIG. 7, reference numeral 710 denotes an equivalent circuit of one small power transmission coil.

One end of the small power transmission coil 710 may be connected to a driving voltage Vcc, and another end thereof may be connected to a switching element 720 provided in the coil driver.

Here, the coil driver may include the switching element 720 connected to the small power transmission coil 710; a multiplexer 750; and an AND gate element 760.

The coil driver may receive input of an enable signal through a terminal 730 and may receive input of a control signal through a terminal 740.

Here, the multiplexer 750 may output the first switching signal A when a control signal, which is input through the terminal 740, is a first control signal, and may output the second switching signal B when a control signal, which is input through the terminal 740, is a second control signal.

The AND gate element 760 may receive the enable signal, which is input through the terminal 730, and an output signal of the multiplexer 750 to control the switching element 720.

Figure 11A:
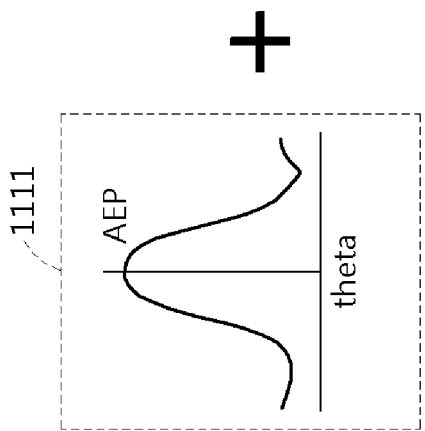
FIG. 11A and FIG. 11B are views illustrating a beam formation manner of the microwave power transmitter illustrated in FIG. 10.
Figure 11A:
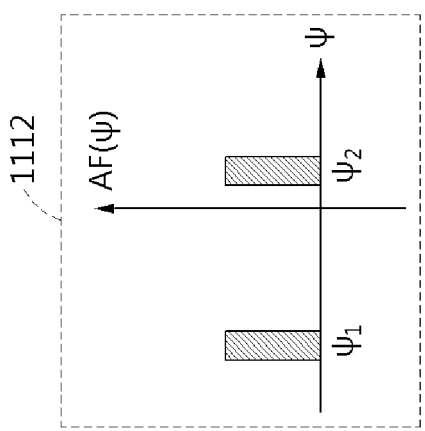
Figure 11A:
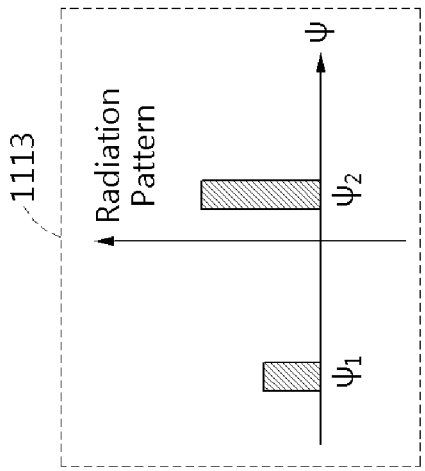
Figure 11B:
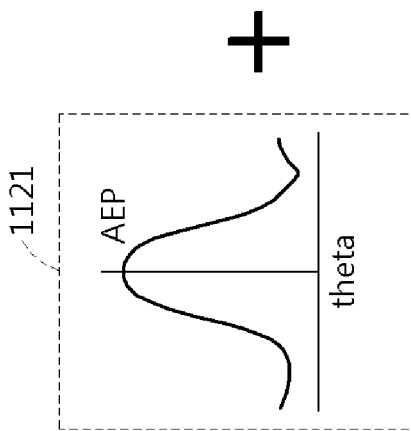
Figure 11B:
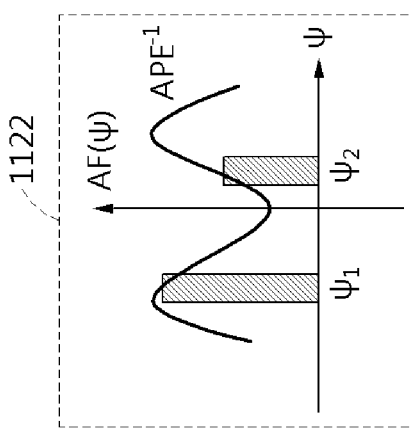
Figure 11B:
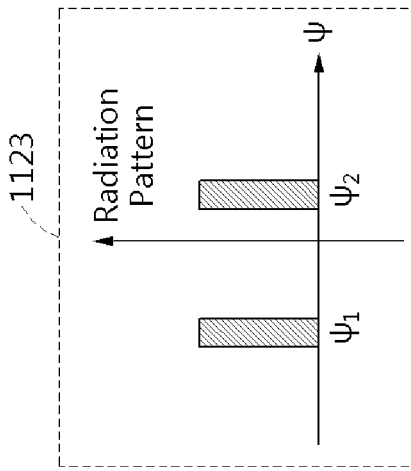

For example, when the small power transmission coil 710 is a power transmission coil to be driven, the first control signal may be input to the terminal 740, and the switching element 720 may be turned on/off by a switching signal such as signal A illustrated in FIGS. 11(a) and 11(b).

The driving voltage Vcc is applied to the small power transmission coil 710 according to on/off of the switching element 720, so that the small power transmission coil 710 operates at a first driving voltage having a first phase.

For example, when the switching element 720 is an NMOS transistor, a capacitor of the small power transmission coil 710 is charged in a time period in which the NMOS transistor is turned on, and is discharged in a time period in which the NMOS transistor is turned off. The magnetic field of an inductor may be controlled through repetition of such charge and discharge.

Figure 8:
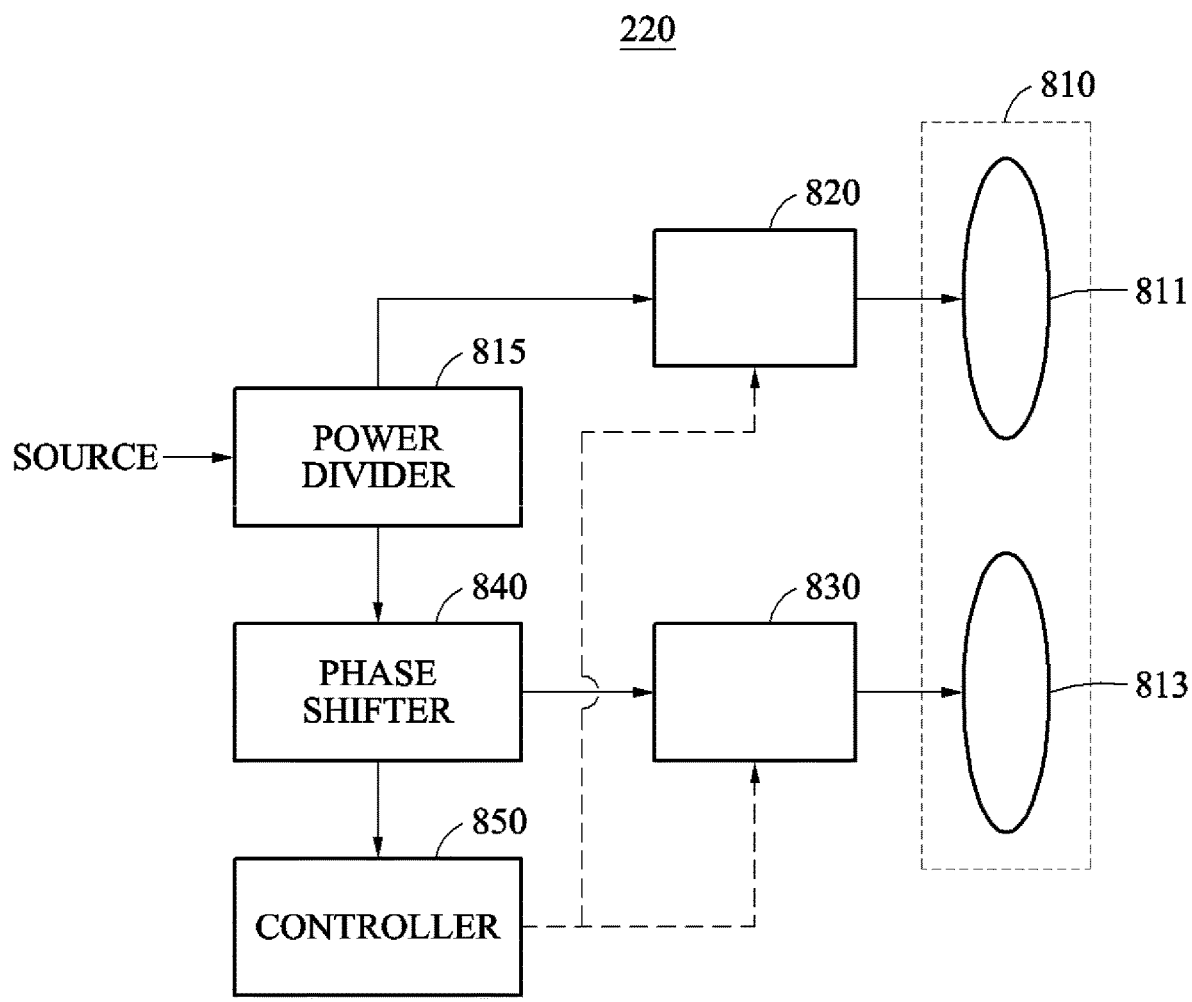
FIG. 8 is a view illustrating another configuration example of the near-field power transmitter of FIG. 2.

FIG. 8 is a view illustrating another configuration example of the near-field power transmitter of FIG. 2.

Referring to FIG. 8, the near-field power transmitter may include a coil part 810 including a plurality of power transmission coils; a power divider 815; a first amplifier 820; a second amplifier 830; a phase shifter 840; and a controller 850.

The coil part 810 transmits wireless power to a reception coil using a magnetic resonance method.

For example, the coil part 810 may include two magnetic resonance coils 811 and 813.

The first and second magnetic resonance coils 811 and 813 may respectively form magnetic coupling with a single reception coil, thereby wirelessly transmitting power.

Such an environment constituted of a plurality of transmission coils and a single reception coil may be referred to as a Multiple Input Single Output (MISO) system.

Meanwhile, an environment constituted of a single transmission coil or a single transmitter and a single reception apparatus may be referred to as a Single Input Single Output (SISO) system.

The MISO system may more efficiently transmit power, and may exhibit superior performance even in an environment in which a power reception apparatus moves, compared to the SISO system.

However, also in the MISO system, magnetic coupling may be greatly affected according to an arranged state of transmission coils and a reception coil.

When phases of currents supplied to the first magnetic resonance coil 811 and the second magnetic resonance coil 813 are differently controlled, magnetic coupling may be formed without being greatly affected by an arrangement state of the transmission coils and the reception coil.

The power divider 815 may divide power supplied from a power source and may output the divided power to the first amplifier 820 and the phase shifter 840.

The phase shifter 840 may change a phase of input power.

The phase shifter 840 may adjust a phase of a current supplied to the second amplifier 830 by adjusting the phase of the input current.

Accordingly, phases of currents supplied to the first magnetic resonance coil 811 and the second magnetic resonance coil 813 may be differently adjusted.

For example, a difference between phases of currents supplied to the first magnetic resonance coil 811 and the second magnetic resonance coil 813 may be set to 0 to 180 degrees.

Through such phase control, an efficiency decrease problem caused by movement of a receiver in the MISO system may be addressed.

Figure 9:
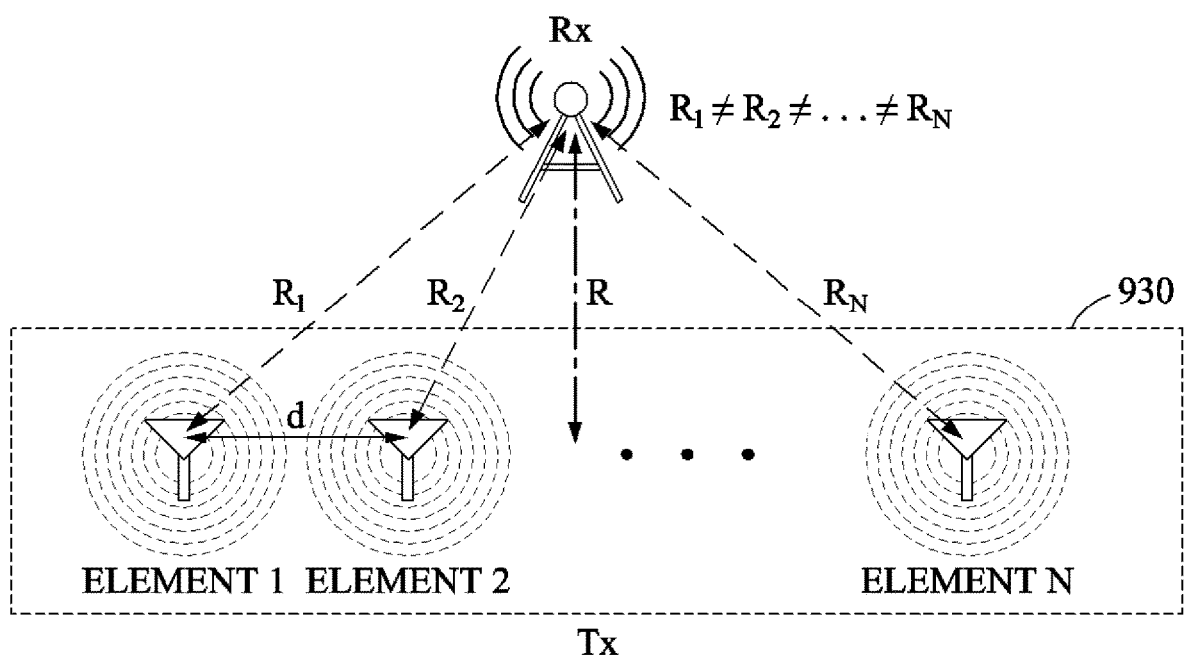
FIG. 9 is a view illustrating the configuration and operation environment of the microwave power transmitter of FIG. 2.

FIG. 9 is a view illustrating the configuration and operation environment of the microwave power transmitter of FIG. 2.

Referring to FIG. 9, the microwave power transmitter may include an array antenna part 930 including a plurality of antenna elements (element 1, element 2, element N).

The array antenna part 930 may adjust radiation characteristics by controlling a phase and the magnitude of distribution current of each of the antenna elements.

Here, reception power may be maximized by adjusting a feeding phase of each radiation element so that the electric field is added in the same phase at a position of a reception antenna.

In general, a distance between an array antenna and a reception antenna is assumed to be very far. Accordingly, power transmission efficiency between the antennas may be calculated by applying the Friis formula represented by Equation 1, after assuming that a distance between each of the antenna elements of the array antenna and the reception antenna is equal:

$$\eta = \frac{P_r}{P_t} = \frac{G_t G_r}{\left(\frac{4\pi R}{\lambda}\right)^2} \quad \text{[Equation 1]}$$

wherein $P_r$ denotes reception power, $P_t$ denotes transmission power, R denotes a distance between the transmission antenna and the reception antenna, $G_t$ denotes a gain of the transmission antenna, and $G_r$ denotes a gain of the reception antenna.

However, the general Friis formula might not be applied to an environment for wireless power transmission because a distance between each of the antenna elements of the array antenna and the reception antenna is different.

Accordingly, the controller 240 or the microwave power transmitter 230 of FIG. 2 calculates power transmission efficiency considering an environment for actual wireless power transmission.

The controller 240 or the microwave power transmitter 230 of FIG. 2 may receive information on reception power through communication with the power reception apparatus, and may calculate power transmission efficiency based on Equation 2 below.

That is, when input power magnitudes of transmission radiation elements are respectively $P_1, P_2, \ldots, P_N$, distances between the reception antenna and the radiation elements are respectively $R_1, R_2, \ldots, R_N$, the radiation elements have the same gain, i.e., $G_{t0}$, and an antenna gain is $G_r$, a power efficiency transmitted to the reception antenna may be represented by Equation 2:

$$\eta = \frac{P_{rec}}{P_{in}} = \frac{G_{t0} G_r}{\sum_{i=1}^{N} P_i} \left(\frac{\lambda_0}{4\pi}\right)^2 \left(\sum_{i=1}^{N} \frac{\sqrt{P_i}}{R_i}\right)^2 \quad \text{[Equation 2]}$$

wherein an average distance between a radiation element at a transmission end and a reception antenna may be defined by Equation 3. In addition, a power transmission efficiency calculation method according to an embodiment of the present invention may be represented by Equation 4:

$$R_{mean} = \frac{N}{\frac{1}{R_1} + \frac{1}{R_2} + \cdots \frac{1}{R_N}}, \left( R_{shortest} < R_{mean} < \frac{\sum_{i=1}^{N} R_i}{N} \right) \quad \text{[Equation 3]}$$

$$\eta = \frac{P_r}{P_t} = \frac{G_t G_r}{\left(\frac{4\pi R_{mean}}{\lambda}\right)^2}. \quad \text{[Equation 4]}$$

Figure 10:
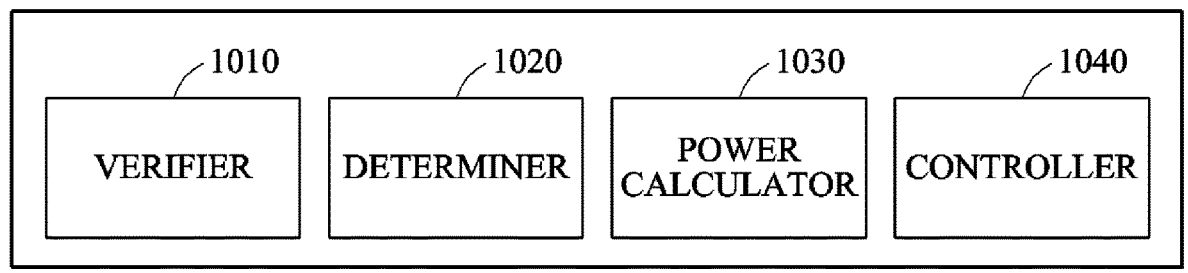
FIG. 10 is a view illustrating another configuration example of the microwave power transmitter of FIG. 2.

FIG. 10 is a view illustrating another configuration example of the microwave power transmitter of FIG. 2.

The microwave power transmitter illustrated in FIG. 10 may control multi-beam formation using an array antenna (not shown).

A verifier 1010 verifies information on a radiation pattern of an array antenna through full-wave simulation. For example, for full-wave simulation, a High Frequency Structure Simulator (HFSS) may be used.

The verifier 1010 verifies a radiation pattern of each of single antennas constituting the array antenna. The radiation pattern may be a radiation pattern modified by interference between an arranged position of the array antenna and surrounding single antennas.

The verifier 1010 calculates an average value of radiation patterns of the single antennas constituting the verified array antenna to generate information on a radiation pattern of the array antenna.

The verifier 1010 may only verify a radiation pattern of at least one of the single antennas constituting the array antenna.

Information on a radiation pattern of the array antenna may be a radiation pattern value of any one single antenna constituting the array antenna, an average value of at least two antennas of the single antennas constituting the array antenna, or an average value of a total of the single antennas constituting the array antenna.

The verifier 1010 may verify information on radiation characteristics of the array antenna before verifying information on a radiation pattern of the array antenna.

The information on the radiation characteristics may include information on the number of main beams, a beam width, a null section, a steering angle, a steering range, an interval between single antennas, etc.

For example, when a user requires formation of three main beams, information on the three main beam formation may be included.

The verifier 1010 may receive input of information on the radiation characteristics through an input device connected to the multi-beam formation control device according to an embodiment of the present invention from a user.

The verifier 1010 may verify radiation patterns of the single antennas through full-wave simulation based on information on the radiation characteristics of the array antenna.

A determiner 1020 determines an Array Factor (AF) based on information on the radiation pattern (AEP).

The AF may be determined to have an optimal gain and steering performance.

The AF is the reciprocal of the information on the radiation pattern (AEP).

The AF may be expressed by Equation 5 below when the array antenna is constituted of N single antennas:

$$AF(\psi) = \sum_{n=1}^{N} \frac{A_n e^{-j(n-1)\psi}}{AEP(\theta)}, (\psi = \beta d \sin \theta) \quad \text{[Equation 5]}$$

wherein $A_n$ denotes the amplitude of an $n^{th}$ single antenna, AEP denotes information on a radiation pattern, $\theta$ denotes a steering angle, d denotes an interval between single antennas, $\beta$ denotes a propagation constant, and $\psi$ denotes a phase difference between adjacent single antennas.

A power calculator 1030 may calculate the amplitude and phase of each of the single antennas constituting the array antenna based on an AF.

The amplitude ($A_n$) and the phase ($\emptyset_n$) of each of the single antennas constituting the array antenna may be calculated according to Equation 6 below:

$$A_n e^{j\emptyset_n} = \frac{1}{2\pi} \int_{-\pi}^{\pi} AF(\psi) e^{-jn\psi} d\psi, (\psi = \beta d \sin \theta) \quad \text{[Equation 6]}$$

wherein AF denotes an array factor, AEP denotes information on a radiation pattern, $\theta$ denotes a steering angle, n denotes the index of a single antenna, d denotes an interval between single antennas, $\beta$ denotes a propagation constant, $A_n$ denotes the amplitude of an $n^{th}$ single antenna, $\emptyset_n$ denotes the phase of an $n^{th}$ single antenna, and $\psi$ denotes a phase difference between adjacent single antennas.

The controller 1040 respectively controls the single antennas based on the calculated respective amplitudes ($A_n$) and phases ($\emptyset_n$).

The controller 1040 respectively controls the single antennas such that the calculated amplitudes ($A_n$) and phases ($\emptyset_n$) are respectively input.

Accordingly, the multi-beam formation control device according to an embodiment of the present invention may minimize an error and more precisely form various beam shapes by calculating and controlling the amplitude and the phase of each of the single antennas using an AF in which an AEP is considered.

In addition, a gain may be improved upon steering and multi-beam formation that directly influence power transmission efficiency in wireless microwave power transmission.

This indicates that not only power transmission efficiency in wireless microwave power transmission may be improved but also a simultaneous charging and avoiding technique of multiple equipment may be improved.

FIGS. 11A and 11B are views illustrating a beam formation manner of the microwave power transmitter illustrated in FIG. 10.

FIG. 11A illustrates a beam formation manner according to a conventional technology, and FIG. 11B illustrates a beam formation manner according to an embodiment of the present invention.

Referring to FIGS. 11A and 11B, a radiation pattern of an array antenna is obtained by multiplying information on a radiation pattern (AEP) by an array factor (AF).

Here, the radiation pattern refers to a radiation pattern of the entirety of array antenna wherein respective radiation patterns of the single antennas are combined.

In a conventional technology, a radiation pattern 1113 is calculated by multiplying an AEP 1111 by an AF 1112. In this case, since a radiation pattern modified by interference between an arranged position of the array antenna and surrounding single antennas is not considered, a gain may be reduced and an error in a beam steering angle may occur.

However, in a method according to an embodiment of the present invention, a radiation pattern 1123 is calculated by multiplying an AF 1122, which has been multiplied by the reciprocal of an AEP, by an AEP 1121.

In this case, it can be confirmed that values are the same in two steering angles ($\psi_1$, $\psi_2$) and multiple beams may be formed.

As such, multiple beams having an improved gain may be formed at a desired steering angle.

Hereinafter, another embodiment of the microwave power transmitter 230 of FIG. 2 is described with reference to FIGS. 12 to 18.

Figure 12:
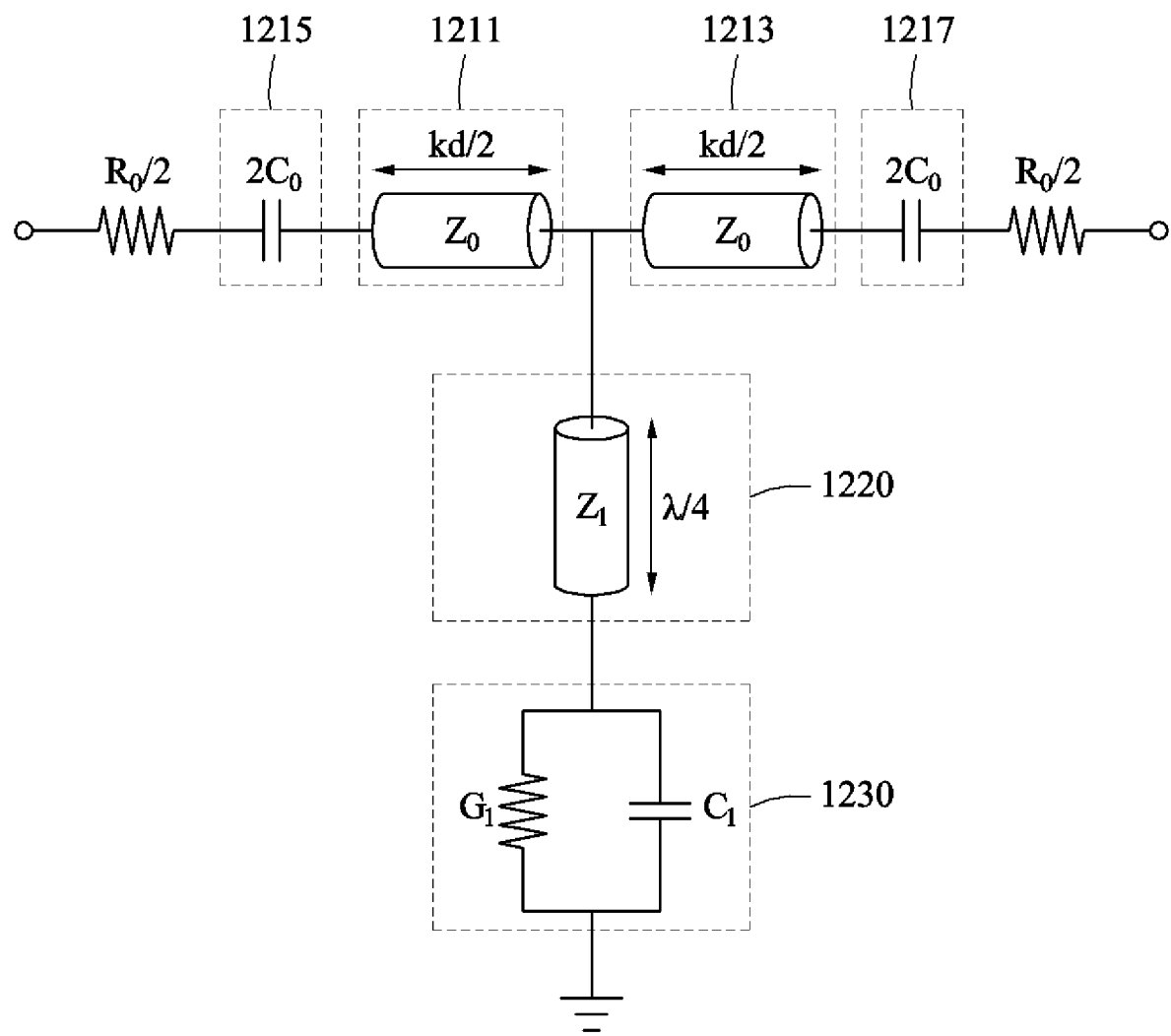
FIG. 12 is a view illustrating a configuration of a single cell of a meta-structure transmission line according to an embodiment of the present invention.

FIG. 12 is a view illustrating a configuration of a single cell of a meta-structure transmission line according to an embodiment of the present invention.

Beam scanning for a three-dimensional space may be performed using the meta-structure transmission line illustrated in FIG. 12. The position of a power reception device may be estimated through beam scanning.

In power transmission in a microwave manner according to a conventional technology, the position of a receiver may be determined by reversing a phase of a received signal and re-sending the same. Here, a reversing circuit is used to reverse a phase. Since the reversing circuit includes circuits such as a mixer and a filler, the configuration of a system thereof is very complicated and an area occupied by the system is very large.

In power transmission in a microwave manner, power may be transmitted to a specific position using a phase shifter. When the phase shifter is used, a power amplifier and the like, other than the phase shifter, are additionally required, whereby the system configuration is complicated and manufacturing costs may increase.

By using the meta-structure transmission line illustrated in FIG. 12, system configuration may be simplified and microwave power transmission may be provided at low manufacturing cost.

Referring to FIG. 12, the meta-structure transmission line includes right-handed transmission lines 1211 and 1213, a shunt transmission line 1220 with a λ/4 length connected in parallel to the right-handed transmission lines 1211 and 1213, and a shunt tunable capacitor 1230 connected to the shunt transmission line 1220.

Here, $R_0$ is a value equivalent to radiation loss in a serial portion of the meta-structure transmission line. In addition, $G_1$ is a value equivalent to radiation loss in a shunt portion of the meta-structure transmission line. In addition, $2C_0$ 1215 and 1217 are values equivalent to capacitance of a serial portion of the meta-structure transmission line.

In FIG. 12, $C_1$ has a capacitance value represented by Equation 7:

$$C_0 = \frac{1}{Z_0} \cdot \frac{1}{\omega(kd + \phi_\omega)}, \quad C_1 = C_0 \cdot \frac{Z_0^2}{Z_1^2} \quad \text{[Equation 7]}$$

In Equation 7 and FIG. 12, $Z_0$ denotes the specific impedance of a right-handed transmission line, kd denotes the electrical length of a right-handed transmission line, $\omega$ denotes the angular velocity of an input signal, $\phi_\omega$ denotes a desired phase of a single cell, and $Z_1$ denotes the specific impedance of the shunt transmission line 1220.

Figure 13:
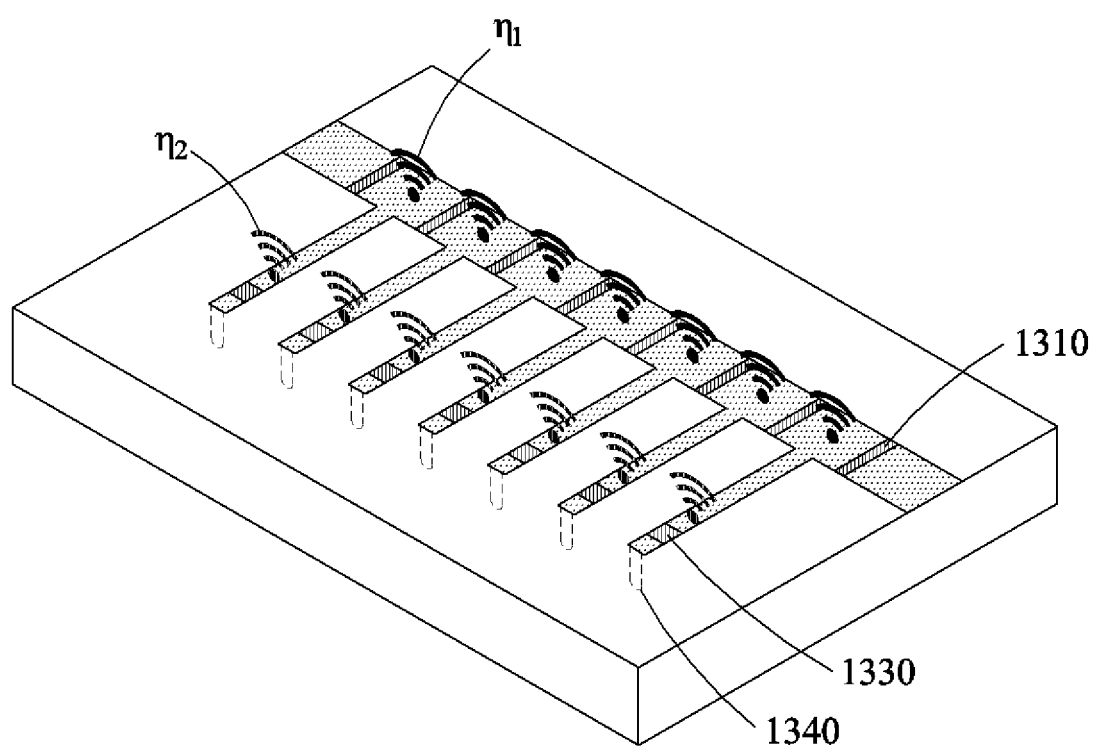
FIG. 13 is a view illustrating a meta-structure transmission line constituted of a plurality of single cells according to an embodiment of the present invention.

The meta-structure transmission line illustrated in FIG. 12 is a unit cell of the entirety of meta-structure transmission line, and a meta-structure transmission line constituted of a plurality of single cells is illustrated in FIG. 13.

FIG. 13 is a view illustrating a meta-structure transmission line constituted of a plurality of single cells according to an embodiment of the present invention.

Referring to FIG. 13, the meta-structure transmission line includes series tunable capacitive elements 1310, shunt tunable capacitive elements 1330, and pins for grounding to a substrate 1340.

In FIG. 13, $\eta_1$ and $\eta_2$ respectively represent emissivity in series and shunt parts. In the meta-structure transmission line according to an embodiment of the present invention, a serial impedance, a shunt admittance, and a specific impedance may be respectively represented by Equations 8 to 10:

$$Z = j\omega L + \frac{1}{j\omega C_0 d} + \frac{R_0}{d} = j\omega\left(L - \frac{1}{\omega^2 C_0 d}\right) + \frac{\eta_1 Z_c}{d} \;(\Omega/\text{m}) \quad \text{[Equation 8]}$$

$$Y = j\omega C + \frac{1}{j\omega L_0 d} + \frac{G_0}{d} = j\omega\left(C - \frac{1}{\omega^2 L_0 d}\right) + \frac{\eta_2 Y_c}{d} \quad \text{[Equation 9]}$$

$$Z_c = \sqrt{\frac{Z}{Y}} = \sqrt{\frac{j\omega L + \frac{1}{j\omega C_0 d} + \frac{R_0}{d}}{j\omega C + \frac{1}{j\omega L_0 d} + \frac{G_0}{d}}} = \sqrt{\frac{j\omega\left(L - \frac{1}{\omega^2 C_0 d}\right) + \frac{\eta_1 Z_c}{d}}{j\omega\left(C - \frac{1}{\omega^2 L_0 d}\right) + \frac{\eta_2 Y_c}{d}}} \quad \text{[Equation 10]}$$

wherein $\omega$ denotes the angular velocity of an input signal, d denote the length of a meta-structure transmission line, L denotes the inductance of a serial portion (right-handed transmission line) of the meta-structure transmission line, and $L_0$ denotes the inductance of a shunt portion of the meta-structure transmission line.

Meanwhile, to utilize a meta-structure transmission line as a wireless power transmission transmitter, the radiometric quantity of a transmission line should be greater than a preset value. In addition, $R_0$ and $G_1$ in FIG. 12 should be greater than preset values. In other words, $\eta_1$ and $\eta_2$ in FIG. 13 should be increased.

In general, $R_0$ and $G_1$ are determined depending upon the structure of an antenna. However, in a radiation structure requiring a low reflection coefficient, $R_0$ and $G_1$ should be determined considering a matching condition.

Accordingly, considering an input impedance change and reflection coefficient according to radiation loss of the serial and shunt portions of the meta-structure transmission line, $\eta_1$ and $\eta_2$ should have the same value. That is, the right-handed transmission lines and the shunt transmission lines with a λ/4 length of the meta-structure transmission line may be designed to have the same reflectance.

Figure 14:
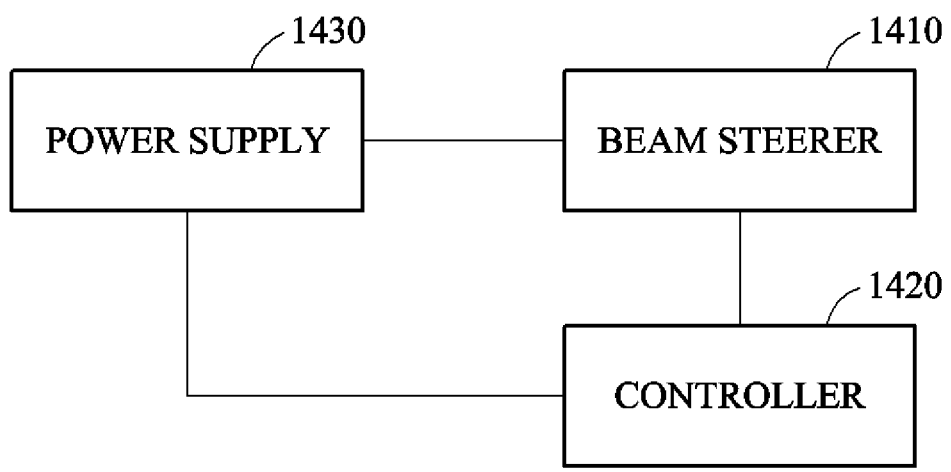
FIG. 14 is a view illustrating the configuration of a wireless power transmission device according to an embodiment of the present invention.

FIG. 14 is a view illustrating the configuration of a wireless power transmission device according to an embodiment of the present invention.

The microwave power transmitter 230 of FIG. 2 may include devices illustrated in FIG. 14.

Referring to FIG. 14, the wireless power transmission device according to an embodiment of the present invention includes a beam steerer 1410, a controller 1420, and a power supply 1430.

The beam steerer 1410 includes a meta-structure transmission line constituted of a plurality of single cells.

The controller 1420 controls an operation mode and beam scanning of the beam steerer 1410.

The power supply 1430 supplies power to the beam steerer 1410 under control of the controller 1420.

Here, each of the single cells may include a right-handed transmission line, a shunt transmission line having a λ/4 length connected in parallel to the right-handed transmission line, and a shunt tunable capacitor connected to the shunt transmission line.

The beam steerer 1410 may operate in a power receiver navigation mode under operation mode control of the controller 1420, or in a power transmit mode of performing beam steering in a receiver direction to transmit power to the receiver.

The beam steerer 1410 may sequentially change a capacitance value ($2C_0$) of a serial tunable capacitor of the right-handed transmission line and a capacitance value ($C_1$) of the shunt tunable capacitor in a receiver navigation mode.

Here, the beam steerer 1410 may determine a beam direction of the beam steerer using $C_0$ and $C_1$ when a reception signal having a preset value or more is detected in the receiver navigation mode.

Here, the controller 1420 may estimate the position of the receiver based on $C_0$ and $C_1$ when a reception signal having a preset value or more is detected in the receiver navigation mode.

In addition, the controller 1420 may control the power supply 1430 such that a power having a preset value or more is supplied to the beam steerer 1410.

Figure 15:
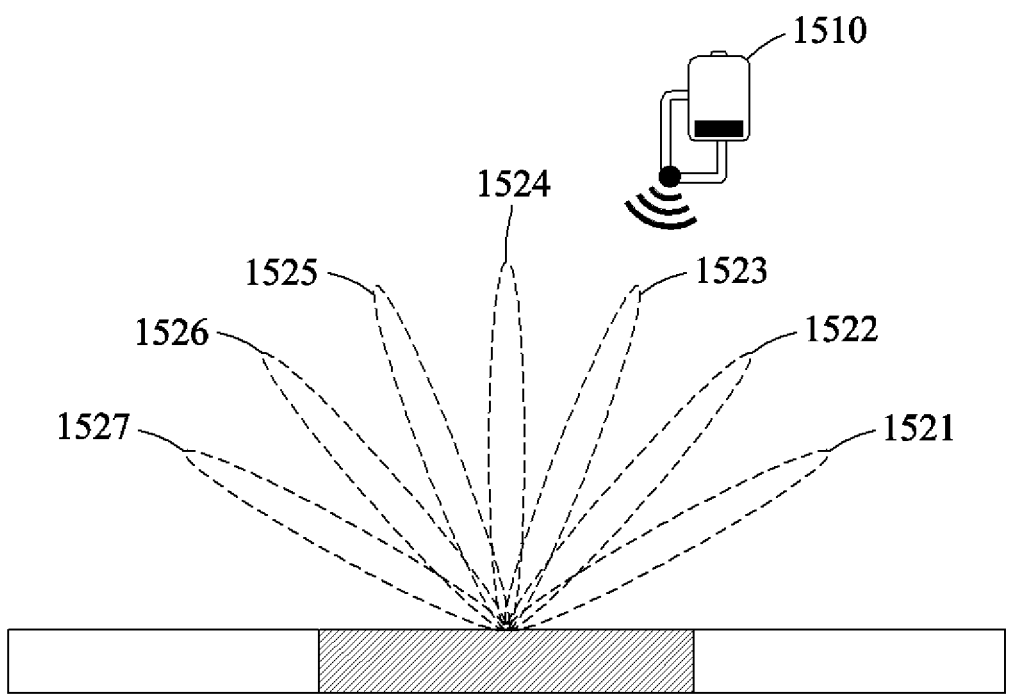
FIG. 15 is a view illustrating a navigation method of a power receiver according to an embodiment of the present invention.

FIG. 15 is a view illustrating a navigation method of a power receiver according to an embodiment of the present invention.

Beam scanning for power receiver navigation illustrated in FIG. 15 may be performed using the device illustrated in FIG. 14.

The device illustrated in FIG. 14 may sequentially adjust beam steering in a direction of 1521 to 1527 by adjusting $C_0$ and $C_1$. For example, in the case wherein a used frequency is 2.4 GHz, kd is 30 degrees, and input and output impedances are 50 ohms, beam steering may be formed in a direction of reference 1522 when $C_0$ and $C_1$ are adjusted to 7.25 pF, beam steering may be formed in a direction of reference 1524 when $C_0$ and $C_1$ are adjusted to 2.47 pF, and beam steering may be formed in a direction of reference 1526 when $C_0$ and $C_1$ are adjusted to 1.48 pF.

Here, the device illustrated in FIG. 14 may operate in a navigation mode of a power receiver 1510, and may operate in a low power mode to receive a signal from the power receiver 1510.

Upon operation in the navigation mode of the power receiver 1510, the beam steerer 1410 of FIG. 14 may operate as an antenna of a communication system.

Accordingly, the largest signal of signals transmitted from the power receiver 1510 may be received by the beam steerer 1410 when beam steering of a power transmission device 1520 heads for a direction of reference 1523.

Accordingly, the largest signal of signals transmitted from the power receiver 1510 may be received by the beam steerer 1410 when beam steering of a power transmission device 1520 is directed in a direction of reference 1523.

For example, the navigation mode may be a mode of navigating a power receiver or a general communication terminal. Here, the navigation mode may include a step of supplying power having a preset value or less for a navigation mode operation to the meta-structure transmission line constituted of a plurality of single cells and a step of performing the navigation mode by sequentially controlling output phases of the meta-structure transmission line.

Figure 16:
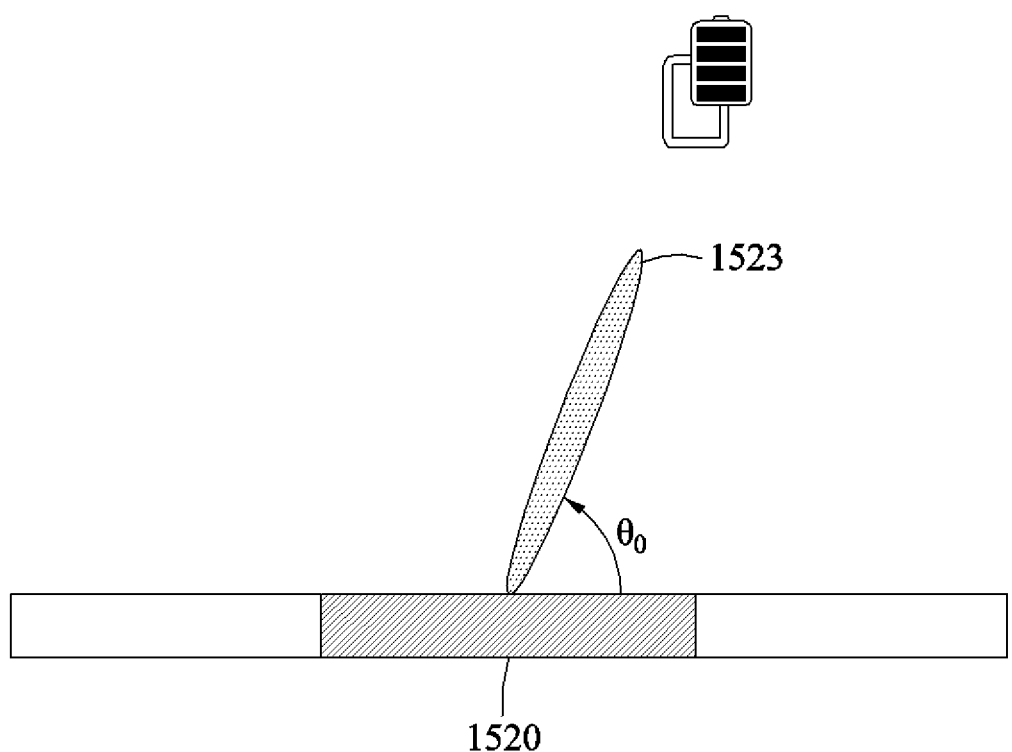
FIG. 16 is a view illustrating an embodiment of transmitting power after navigation by a power receiver.

FIG. 16 is a view illustrating an embodiment of transmitting power after navigation by a power receiver.

As illustrated in FIG. 15, when the power receiver 1510 is navigated, the controller 1420 may fix beam steering to a direction of reference 1523 and may perform power transmission.

Here, power supplied to the beam steerer 1410 from the power supply 1430 may be increased by a preset value as compared to the receiver navigation mode.

Meanwhile, beam steering using the meta-structure transmission line according to an embodiment of the present invention may adopt a manner of transmitting power in a "direction" in which a receiver is located. When distance information on the receiver is obtained, the position of the receiver may be represented in a spherical coordinate system (r, θ, ϕ) and power may be concentrated on the "position" of the receiver.

Here, the principle of concentrating power on the "position" of the receiver may include adjusting respective radiation signals of the single cells of the meta-structure transmission line at the position of the receiver to meet in the same phase.

When respective phases of the single cells are determined, power may be set to be transmitted in a specific direction or power may be set to be concentrated on a specific position by adjusting respective capacitance values of the single cells using [Equation 7].

Figure 17:
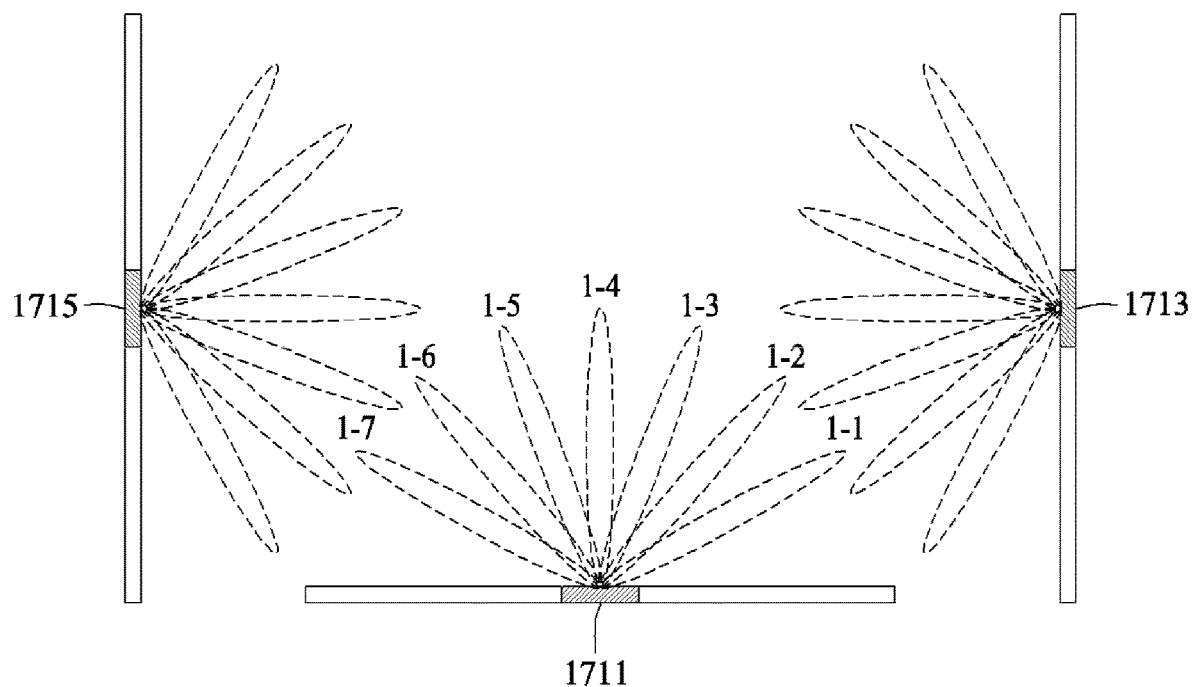
FIGS. 17 and 18 are views illustrating the structures of installation examples and operation examples of the beam steerer illustrated in FIG. 14.
Figure 18:
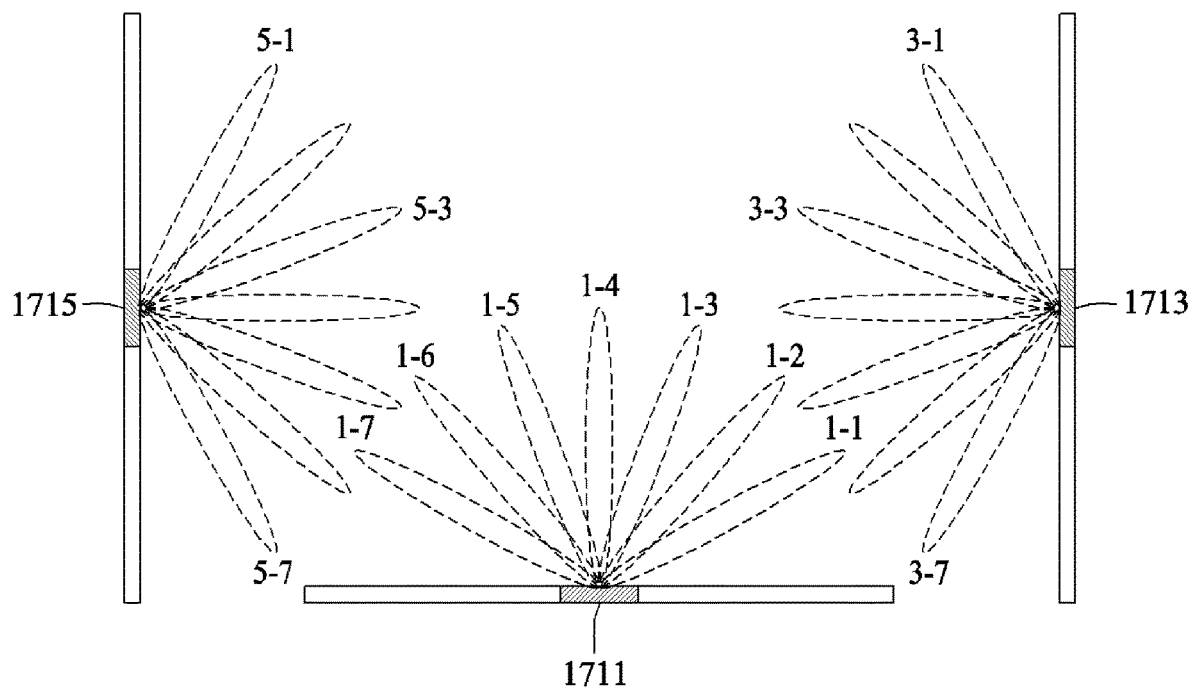

FIGS. 17 and 18 are views illustrating the structures of installation examples and operation examples of the beam steerer illustrated in FIG. 14.

Referring to FIGS. 17 and 18, the beam steerer 1410 of FIG. 14 may include a first beam steerer 1711, a second beam steerer 1713, and a third beam steerer 1715.

The first beam steerer 1711 may perform beam scanning in a wireless charging area, i.e., a floor or ceiling of a three-dimensional space.

The second beam steerer 1713 may perform beam scanning on a left or right wall of the wireless charging area.

The third beam steerer 1715 may perform beam scanning on an opposite side of the second beam steerer 1713.

Here, the controller 1420 of FIG. 14 may control a beam scanning progress direction and beam steering change time of each of the first, second, and third beam steerers 1711, 1713, and 1715.

The controller 1420 may control a beam scanning progress direction and beam steering change time of each of the first beam steerer 1711, the second beam steerer 1713 and the third beam steerer 1715 such that beam scanning does not overlap in a three-dimensional space.

For example, the first beam steerer 1711 may perform beam scanning in a direction of reference 1-7, starting from a direction of reference 1-1.

The second beam steerer 1713 may perform beam scanning in a direction of reference 3-1, starting from a direction of reference 3-7.

The third beam steerer 1715 may perform beam scanning in a direction of reference 5-1, starting from a direction of reference 5-7.

The aforementioned device may be realized by hardware component, a software component, and/or a combination of hardware and software components. For example, the device and components described in the embodiments may be realized using one or more general-purpose computers or special-purpose computers such as, for example, a processor, a controller, an arithmetic logic unit (ALU), a digital signal processor, a microcomputer, a field programmable array (FPA), a programmable logic unit (PLU), a microprocessor, or other devices implementing instructions and responding thereto. The processor may execute one or software applications that run on an operating system (OS). In addition, the processor may approach data, store, manipulate, and process the data, and generate new data by responding to running of software. Although one processor has been used to aid in understanding, those skilled in the art can understand that the processor may include a plurality of processing elements and/or a plurality of processing element types. For example, the processor may include a plurality of processors or a combination of one processor and controller. Further, another processing configuration, such as a shunt processor, may be applied.

Software may include a computer program, code, instructions, or a combination of one or more of the foregoing, and may configure a processing device to operate as desired or independently or collectively a command to a processing device. Software and/or data may be permanently or temporarily embodied in the form of any type of machines, components, physical devices, virtual equipment, computer storage media or devices, or a signal wave to be transmitted, so as to be interpreted by a processing device or to provide a command or date to a processing device. Software may be distributed over a networked computer system, and stored or executed in a distributed manner. Software and data may be stored on one or more computer readable media.

Embodiments of the present invention can include a computer readable medium including program commands for executing operations implemented through various computers. The computer readable medium can store program commands, data files, data structures or combinations thereof. The program commands recorded in the medium may be specially designed and configured for the present invention or be known to those skilled in the field of computer software. Examples of a computer readable recording medium include magnetic media such as hard disks, floppy disks and magnetic tapes, optical media such as CD-ROMs and DVDs, magneto-optical media such as floptical disks, or hardware devices such as ROMs, RAMs and flash memories, which are specially configured to store and execute program commands. Examples of the program commands include a machine language code created by a compiler and a high-level language code executable by a computer using an interpreter and the like. The hardware devices may be configured to operate as one or more software modules to perform operations in the embodiments, and vice versa.

Although exemplary embodiments of the present invention have been disclosed for illustrative purposes, those skilled in the art will appreciate that various modifications, additions and substitutions are possible, without departing from the scope and spirit of the invention as disclosed in the accompanying claims. For example, proper result may be achieved even if the techniques described above are implemented in an order different from that for the disclosed method, and/or disclosed constituents such as a system, structure, device and circuit are coupled to or combined with each other in a form different from that for the disclosed method or replaced by other constituents or equivalents.

It should be understood, however, that there is no intent to limit the invention to the embodiments disclosed, rather, the invention is to cover all modifications, equivalents, and alternatives falling within the spirit and scope of the invention as defined by the claims.

The invention claimed is:

1. A wireless power transmission device using a meta-structure transmission line capable of performing beam steering, comprising:
   a beam steerer comprising a meta-structure transmission line constituted of a plurality of single cells;
   a controller configured to control an operation mode and beam scanning of the beam steerer; and
   a power supply configured to supply power to the beam steerer under control of the controller,
   wherein each of the single cells comprises a right-handed transmission line, a shunt transmission line with a $\lambda/4$ length connected in parallel to the right-handed transmission line, and a shunt tunable capacitor connected to the shunt transmission line.

2. The wireless power transmission device according to claim 1, wherein the beam steerer operates in a power receiver navigation mode under operation mode control of the controller, or in a power transmission mode of transmitting power to the receiver by performing beam steering in a direction of the receiver.

3. The wireless power transmission device according to claim 2, wherein the beam steerer sequentially changes a capacitance value ($C_0$) of a serial tunable capacitor of the right-handed transmission line in the receiver navigation mode and a capacitance value ($C_1$) of the shunt tunable capacitor, and
   the controller estimates a position of the receiver based on $C_0$ and $C_1$ when a reception signal having a preset value or more is detected in the receiver navigation mode.

4. The wireless power transmission device according to claim 3, wherein the beam steerer determines a beam direction of the beam steerer using $C_0$ and $C_1$ when a reception signal having a preset value or more is detected in the receiver navigation mode, and
   the controller controls the power supply such that power having a preset value or more is supplied to the beam steerer.

5. The wireless power transmission device according to claim 1, wherein the right-handed transmission line and the shunt transmission line with a $\lambda/4$ length have the same reflectance.

6. The wireless power transmission device according to claim 1, wherein the beam steerer comprises:
   a first beam steerer configured to perform beam scanning on a floor or ceiling of a wireless charging area;
   a second beam steerer configured to perform beam scanning on a left or right wall of the wireless charging area; and
   a third beam steerer configured to perform beam scanning on an opposite side of the second beam steerer,
   wherein the controller controls a beam scanning progress direction and beam steering change time of each of the first, second, and third beam steerers.

7. A method of operating a meta-structure transmission line capable of performing beam steering, the method comprising:
   a step of supplying power having a preset value or less for navigation mode operation to a meta-structure transmission line constituted of a plurality of single cells; and
   a step of performing the navigation mode by sequentially controlling output phases of the meta-structure transmission line,
   wherein each of the single cells comprises a right-handed transmission line, a shunt transmission line having a $\lambda/4$ length connected in parallel to the right-handed transmission line, and a shunt tunable capacitor connected to the shunt transmission line.

8. The method according to claim 7, wherein the output phases of the meta-structure transmission line are controlled by sequentially changing a capacitance value ($C_0$) of a serial tunable capacitor of the right-handed transmission line in the receiver navigation mode and a capacitance value ($C_1$) of the shunt tunable capacitor.

9. The method according to claim 8, further comprising a step of determining a beam direction of the beam steerer using $C_0$ and $C_1$ when a reception signal having a preset value or more is detected in the navigation mode and supplying power having a preset value or more to the meta-structure transmission line.

10. The method according to claim 7, wherein the right-handed transmission line and the shunt transmission line having a $\lambda/4$ length have the same reflectance.

* * * * *